(12) United States Patent
Angeby

(10) Patent No.: US 10,288,032 B2
(45) Date of Patent: May 14, 2019

(54) METHOD FOR MONITORING COMBUSTION PROCESSES IN A COMBUSTION ENGINE

(71) Applicant: SEM AB, Amal (SE)

(72) Inventor: Jakob Angeby, Karlstad (SE)

(73) Assignee: SEM AB, Amal (SE)

( * ) Notice: Subject to any disclaimer, the term of this patent is extended or adjusted under 35 U.S.C. 154(b) by 0 days.

(21) Appl. No.: 15/496,532

(22) Filed: Apr. 25, 2017

(65) Prior Publication Data
US 2017/0234286 A1 Aug. 17, 2017

Related U.S. Application Data

(63) Continuation of application No. 14/371,643, filed as application No. PCT/SE2013/050067 on Jan. 30, 2013, now Pat. No. 9,651,453.
(Continued)

(30) Foreign Application Priority Data

Jan. 30, 2012 (SE) ........................................ 1250062
Jan. 30, 2012 (SE) ........................................ 1250063

(51) Int. Cl.
*G01M 15/04* (2006.01)
*F02P 5/15* (2006.01)
(Continued)

(52) U.S. Cl.
CPC .......... *F02P 5/151* (2013.01); *F02D 41/0085* (2013.01); *F02D 41/1497* (2013.01);
(Continued)

(58) Field of Classification Search
USPC ........ 73/35.03, 35.06, 35.08, 114.62, 114.67
See application file for complete search history.

(56) References Cited

U.S. PATENT DOCUMENTS 5,396,176 A 3/1995 Ishii et al.
5,769,049 A 6/1998 Nytomt
(Continued)

FOREIGN PATENT DOCUMENTS

JP 20060230094 3/2008

OTHER PUBLICATIONS

International Search Report for PCT/SE2013/050067, dated Jun. 10, 2013, 4.
(Continued)

*Primary Examiner* — Eric S. McCall
(74) *Attorney, Agent, or Firm* — Johnson, Marcou & Isaacs, LLC; John M. Harrington, Esq.

(57) ABSTRACT

A method for extracting characterizing features from an ion current trace retrieved from spark plugs of cylinders of an internal combustion engine, comprises the steps of: i. dividing the ion current signal into crank angle subintervals; ii. calculating a measure of ion current in each crank angle subinterval; and iii. Performing a calculation on the measure of ion currents from different subintervals such that the result of the calculation is dimension free. Further it relates to a method of monitoring combustion processes where a plurality of ion current signals from a number of spark plugs (4A, 4B) are retrieved and used in combination.

1 Claim, 3 Drawing Sheets

Related U.S. Application Data

(60) Provisional application No. 62/623,231, filed on Apr. 12, 2012, provisional application No. 61/623,238, filed on Apr. 12, 2012.

(51) Int. Cl.

| | | |
|---|---|---|
| *G01M 15/11* | (2006.01) | |
| *F02D 41/22* | (2006.01) | |
| *G01L 23/22* | (2006.01) | |
| *G01M 15/00* | (2006.01) | |
| *F02D 41/00* | (2006.01) | |
| *F02D 41/14* | (2006.01) | |
| *F02D 41/26* | (2006.01) | |
| *F02D 35/02* | (2006.01) | |
| *F02P 17/12* | (2006.01) | |

(52) U.S. Cl.
CPC ......... *F02D 41/221* (2013.01); *F02D 41/263* (2013.01); *F02P 5/1512* (2013.01); *F02P 5/1514* (2013.01); *G01L 23/221* (2013.01); *G01M 15/00* (2013.01); *G01M 15/11* (2013.01); *F02D 35/021* (2013.01); *F02P 2017/125* (2013.01); *Y02T 10/46* (2013.01)

(56) References Cited

U.S. PATENT DOCUMENTS

| | | |
|---|---|---|
| 6,185,984 B1 | 2/2001 | Takahashi et al. |
| 6,199,540 B1 | 3/2001 | Katashiba et al. |
| 6,298,823 B1 | 10/2001 | Takahashi et al. |
| 6,371,078 B1 | 4/2002 | Kondo et al. |
| 6,483,311 B1 | 11/2002 | Ketterer et al. |
| 8,099,996 B2 | 1/2012 | Nytomt et al. |
| 2002/0033041 A1 | 3/2002 | Yamada et al. |
| 2002/0069696 A1 | 6/2002 | Hatazawa et al. |
| 2004/0084018 A1* | 5/2004 | Zhu ................ F01N 3/2006 123/406.14 |
| 2004/0084024 A1 | 5/2004 | Malaczynski et al. |
| 2004/0084025 A1 | 5/2004 | Zhu et al. |
| 2004/0085070 A1* | 5/2004 | Daniels ........... F02D 35/027 324/391 |
| 2004/0094124 A1 | 5/2004 | Viele et al. |
| 2009/0108846 A1 | 4/2009 | Koda et al. |
| 2009/0126461 A1 | 5/2009 | Liu et al. |
| 2009/0292438 A1 | 11/2009 | Nolte et al. |
| 2010/0006066 A1* | 1/2010 | Danne ............. F02P 3/0453 123/406.26 |
| 2010/0077834 A1* | 4/2010 | Daniels .......... F02D 41/0025 73/23.31 |
| 2010/0257921 A1 | 10/2010 | Tanaya et al. |
| 2011/0203358 A1 | 8/2011 | Tanaya et al. |
| 2012/0291524 A1 | 11/2012 | Bengtsson et al. |

OTHER PUBLICATIONS

Office Action for U.S. Appl. No. 14/371,643, dated Aug. 18, 2016, 10.

\* cited by examiner

METHOD FOR MONITORING COMBUSTION PROCESSES IN A COMBUSTION ENGINE

PRIORITY APPLICATION

This application claims priority to and is a continuation of U.S. patent application Ser. No. 14/371,643 filed Jul. 10, 2014, entitled "Method for Monitoring Combustion Processes in a Combustion Engine" (title changed by Examiner), which was the U.S. National Stage of International Application No. PCT/SE2013/050067, filed Jan. 30, 2013, published in English under PCT Article 21(2), which claims the benefit of Swedish Patent Application No. 1250062-5, filed Jan. 30, 2012, and Swedish Patent Application No. 1250063-3, filed Jan. 30, 2012, and U.S. Provisional Patent Application No. 61/623,231, filed Apr. 12, 2012, and U.S. Provisional Patent Application No. 61/623,238, filed Apr. 12, 2012, the entire contents of each of which are hereby expressly incorporated herein by this reference including, without limitation, the specification, claims, and abstract, as well as any figures, tables, or drawings thereof.

FIELD OF THE INVENTION

The present invention relates to a method for monitoring combustion processes and a method for extracting characterizing features by means of an ion current trace retrieved from spark plugs of cylinders of an internal combustion engine.

PRIOR ART

Cylinder imbalance w.r.t. in cylinder air/fuel ratio is a well-known problem among engine manufacturers and is a cause for excessive fuel consumption and emissions. In most SI engines, a "global" lambda sensor, i.e. a lambda sensor common for all cylinders, measures the average of the air/fuel ratio from a group of cylinders (the cylinders connected to the same exhaust manifold where the lambda sensor is mounted). There may, however, be significant imbalances between the individual cylinders w.r.t. the in-cylinder air/fuel ratios without this being detected by the lambda sensor. This may be due to wear or faults in the fuel injectors or it can be due to uneven air supply to the cylinders caused by thermodynamic phenomena in the inlet and exhaust manifolds. An imbalance degrades the performance of the engine and needs to be detected and compensated for.

Another well-known problem is that the fuel quality may change. A change in the fuel quality may change the combustion phasing due to differences in the laminar flame speed which will lead to increased fuel consumption and excessive emissions. Variations in fuel quality is, for example, a problem when using natural gas, wherein the fuel quality may change from one fuelling to another depending on how gas from different wells have been mixed in the pipeline transportation system. The quality of liquid fuels varies as well, but not as much within the same geographical area as the quality of natural gas. However, from a global perspective, the fuel qualities of liquid fuels vary significantly as well. If the variation in fuel quality is not compensated for in the engine control, then the performance of the engine may be significantly degraded.

In the field of spark ignited combustion engines, ion current measurements have been used for a couple of decades for detecting knock and for determining whether a piston is in compression top dead center or gas exchange top dead center, hence presenting an alternative to a cam shaft- and knock sensors.

The ion current is extracted by applying a voltage over the electrodes of the spark plug and then measure the current resulting from the voltage. The current will be inversely proportional to the resistance of the gas in the cylinder, which in turn depends on cylinder pressure, temperature, fuel additives, and air humidity as well as other factors.

One challenge in retrieving combustion process information using ion current measurements is that all these different properties affect the ion current, and separating the effects from one another has proven to be very difficult. For example, it has been common practice to estimate the in-cylinder air/fuel ratio by computing a measure related to the derivative of the chemi phase, i.e. the combustion phase where the ion current signal emanates from the chemical composition of the in-cylinder gases. However, the ionization intensity changes with auxiliary parameters such as the air humidity or the fuel quality. When the ionization intensity changes, then also the measure of the derivative of the chemi phase in the ion current will change and consequently the estimate of the in-cylinder air/fuel ratio will change. Clearly, any measure of the ion current that correlates well with air/fuel ratio but also depends on auxiliary parameters will become biased if these auxiliary parameters change. If the influence of the auxiliary parameters is large enough, the air/fuel ratio estimate will be useless for engine control, which has proven to be the case when using measures of the derivative of the chemi phase as feature for in-cylinder air/fuel ratio estimation.

Another difficulty with ion current measurements is that the ion current fluctuates significantly in a stochastic manner from one cycle to another. This makes it very difficult to compute a single value from the ion current that correlates well with a combustion parameter of interest.

All modern gasoline fueled cars are equipped with three way catalysts. Such catalysts have the task of completing the combustion, such that emissions of unburned hydrocarbons, carbon monoxide and nitric oxides are reduced to almost zero levels. And they actually work, provided that the engine control is able to keep the air/fuel equivalence ratio at one, i.e. such that the engine is supplied with precisely the amount of air that is necessary to completely burn all fuel supplied to the engine. If more air is supplied to the engine, the catalyst will not be able to reduce the emissions of nitric oxides, if less air is supplied, the catalyst will not be able to reduce the emissions of unburned hydrocarbons and carbon monoxide.

In order to control the engine such that the air/fuel equivalence ratio is precisely at one, a lambda sensor is used. The lambda sensor is placed in the exhaust system, usually upstream the catalyst, and it measures whether there is any oxygen present in the exhausts or not. To put it simply, if there is any oxygen in the exhausts, the engine control system will increase the amount of fuel supplied to the engine, if there is no oxygen present in the exhausts, the engine control system will decrease the amount of fuel supplied to the engine. Usually, there is only one lambda sensor provided in the exhaust system, and one possible problem might therefore be that the cylinders run in an uneven fashion, i.e. such that some cylinders run in a fuel-rich mode, and some cylinders run in a fuel-lean mode; since the lambda sensor only will sense an average of the air/fuel equivalence ratio, such imbalance will not be detected, and consequently, no corrective measures can be taken.

One problem with the ion current signal from a cylinder of a spark ignited combustion engine is that the ion current signal is rather unpredictable in the sense that it varies stochastically from cycle to cycle and the ion current characteristics is different in different cylinders although they all run under the same engine operating point (engine control parameters). The stochastic ion current fluctuation in a cylinder from cycle to cycle results from the ion sensing being a local measurement of the ionization around the spark plug and hence will be affected by any inhomogeneity in the combustion gases and turbulence and swirl in the combustion chamber. The difference in characteristic (mean) ion current trace between different cylinders running under the same engine operating point can be explained by pressure differences at the cylinder inlet and exhaust valves, respectively, which in turn give rise to cylinder individual differences in filling of fresh air and fuel mixture as well as internal exhaust gas recirculation. Moreover, different fuels may give different ion currents (for example, if there is salt in the fuel, the ion current will increase significantly). Furthermore, the ion current signal depends on the type of spark plug and its condition. Therefore, the ion current may change should the spark plug be replaced, and it may also be affected by wear and soot fouling of the spark plug. All of this makes it very hard to retrieve robust information about the combustion process using ion current measurements, although the ion current signal contains much information about the combustion process.

The challenge to retrieve robust combustion information from ion current measurements has attracted significant attention. For example, in JP20060230094 the ratio between the minimum value in a first interval of the ion current and the maximum value in a second interval is used as feature together with the mean value in a third interval. The hereby computed features are used to extract information from the ion current. In US 2004/0084024 a wavelet transform is applied to ion current measurements in an interval. The most significant wavelets are identified and used to reconstruct a replica of the ion current measurement in the interval which is less noisy and more robust against fluctuations. In U.S. Pat. No. 5,769,049 the derivative of the ion current measurement in the flame ionization (chemi) interval is used as feature to estimate the air/fuel ratio. There are plenty algorithms suggested that, just as those sited above, extract features from the ion current measurements that in one form or the other use absolute values in the ion current measurements, e.g. a maximum or minimum or a derivative or a mean value or the like. However, such features will change in value with changes in amplification of the ion current. Consequently, combustion parameter estimates produced by algorithms based on such features will also change with the amplification level and therefore useless for industrial applications since the amplification of the ion current depends on ambient parameters not under the control of the user. Moreover, features that are defined by a single sample value such as an extreme value (e.g. a minimum) are very sensitive to noise and fluctuations in the ion current. Combustion parameter estimates produced by algorithms based on such features will therefore also be very sensitive to noise and fluctuations in the ion current.

In many industrial designs of ion sense systems the ion current measuring electronic circuit is placed in a central computation unit. In such designs the ion current is transported from the spark plug through cables to the unit. Such a communication channel is prone to pick up noise which degrades the performance and is an impractical solution. Therefore there is a trend to integrate the ion current measuring electronic circuits with the ignition coil and the whole package may be mounted on the spark plug, hereby alleviating the aforementioned problems. Then, the measured ion current may be amplified and communicated which makes it less sensitive to noise. In both of the aforementioned approaches the whole (analogue) ion current signal is communicated to the central unit for further processing. A preferred solution that would be robust and reduce the amount of data to be transported from the ignition coil to the central unit would be to compute the ion current features using electronic circuits in conjunction with a measuring electronic circuit integrated with the ignition coil that may be mounted on the spark plug. However, this has been a challenge since the environment by the ignition coil is harsh with large temperature changes and electromagnetic fields and vibrations not suitable for electronic circuits in mass production.

It is beneficial to have algorithms that can process the ion current features efficiently and retrieve reliable and combustion robust information, e.g., that the combustion in the cylinder is too rich or too lean or that the combustion phase is too early or too late for optimal combustion. There are many different features that can be computed from ion current measurements and that in some way or another correlate with a combustion parameter of interest. This has given rise to many different disclosed methods that rely on a tabulated mapping from a single feature, or a linear combination (typically the mean) of features, to a combustion parameter of interest. Such an approach is used in U.S. Pat. No. 5,769,049 in which the derivative of the rising flank of the chemi phase is computed and mapped to an air/fuel ratio value. Similarly, in US 2004/0084025 A1 an algorithm is disclosed that uses the minimum value in the "valley" formed in the interval between the peaks of the chemi and thermo phases together with the maximum value of the thermo phase. The mean of the two values is used as a function to be optimized for air/fuel ratio control and can only be used during wide open throttle (WOT) engine operating conditions when the gasoline engine is run using an air/fuel ratio which yields an optimal flame propagation speed. A similar algorithm based on the mean of a number of features (maximum, minimum values and inflexion points) is also used in US 2004/0084025 A1 to control the combustion phasing (MBT). The optimizations are done using a numerical search and active control parameter (e.g. air/fuel ratio) perturbations. In common for such methods is that they result in more or less unreliable combustion parameter estimates.

SUMMARY OF THE INVENTION

One aspect of the invention is based on the finding that when the ion current measurements from the cylinders are treated isolated from each other and the method uses only the first order statistical moment (e.g. mean values) to compute combustion parameters, then the available combustion information is not used efficiently and this leads to problems. The problem with treating the ion current features from different cylinders isolated from each other is twofold. First, the combustion process is different in different cylinders even when they are tuned to optimal conditions due to cylinder individual differences w.r.t. breathing of fresh air and exhaust gas. Second, it is impossible, or at least very hard, to separate a case of a change (malfunction) in a single cylinder from a change in all cylinders that would occur with a change in fuel quality or some other auxiliary parameter.

The problem with using only a single feature in a method to compute combustion parameters is that it becomes very sensitive to noise.

The problem with using only a first order statistical moment when combining more than one feature is that the features are typically weighted equal and as a consequence important information is lost. As pointed out above there are many different features that can be computed from an ion current and that correlate with a combustion parameter. However, they carry different quality of information. For example, one feature may vary more than another from cycle to cycle (greater variance), or one feature may change more than another with a change in combustion parameter (greater dependence). Moreover, the variance and dependency of the features may vary with the engine operating condition.

It is an object of the invention to eliminate, or at least reduce, the problems mentioned above, as defined in the independent claims. Thanks to the invention, means including inventive features may be achieved that are substantially stable when the amplification level changes and that may also have an inherent low-pass characteristic and that may also be suitable to implement close to the ion current measurement electronic source using electronic circuits.

It is also an object of the present invention to provide a method enabling the use of a plurality of ion current features from each cylinder of a spark ignited combustion engine to provide a measure usable for balancing of the combustion processes of each cylinder, the method being such that it adapts to different engine operating conditions and is simple to calibrate and apply.

Another object of the invention is a method to detect if there is a change in fuel quality and determine which fuel out of a pre-determined set of possible fuels that the engine is running on.

According to one aspect of the invention it comprises the steps of:

dividing the ion current signal into crank angle subintervals;

calculating the area of the ion current in each crank angle subinterval; and performing a calculation on the area of the ion currents in different sub intervals such that the result of the calculation is dimension free.

In order to reduce impact of signal amplitude, a first crank angle interval related to one of the above mentioned crank angle subintervals, may lie totally within a substantially larger second crank angle interval, that preferably may represent the total crank angle interval including all crank angle sub intervals.

Laboratory tests have shown that it may be beneficial if the first crank angle sub interval lies within the interval from 0 crank angle degrees to 10 crank angle degrees after top dead center. Likewise, the tests have shown that the second crank angle interval may lie within the interval 0-90 crank angle degrees after top dead center.

One efficient way to retrieve a dimensionless result from the calculation is division of the area of the ion current in the sub intervals with the area of the ion current in the substantially larger second interval. In this case, it is especially beneficial if the first interval lies within the second interval, wherein the second interval preferably may represent the total interval of all crank angle subintervals.

For determining combustion phasing, calculation of a center of mass of the ion currents of the subintervals may be useful.

According to a further aspect of the invention it comprises the steps of:

computing a measure of how different the combustion is that of a preferred one;

comparing the hereby computed measures from a plurality of cylinders in the engine;

performing statistical hypothesis tests regarding deviation from desired operation;

performing a second statistical hypothesis testing if there is a deviation from the desired operation to determine the reason for the faulty condition.

In order to increase the quality of the combustion parameter information(s) the method may include second or higher order statistical moments.

BRIEF DESCRIPTION OF THE DRAWINGS

In the following, the invention will be described with reference to the appended drawings, wherein.

DESCRIPTION OF EMBODIMENTS

As mentioned in the "Prior art" chapter, the object of the present invention is to use ion current signals retrieved from spark plugs of cylinders of an internal combustion engine for enabling detection of whether all cylinders of an internal combustion engine run in a desired combustion process mode. As an example of a desired combustion process mode, consider the requirement that all cylinders in an engine shall have the same in-cylinder air/fuel ratio, which is often referred to as a balanced mode with respect to the air/fuel ratio. This example will be used throughout the description to illustrate the invention. However, the invention is not limited to in-cylinder air/fuel ratio balancing, but can be applied to any control parameter of choice that affects the combustion (ionization) process, such as the ignition timing, amount of residual gas, differences in fuel evaporation, inlet pressure and other parameters. In the following, consider in-cylinder air/fuel ratio. If, for example, the air/fuel ratio in a cylinder is altered from the desired value, then this will affect the combustion process such that its characteristics also deviate from the desired. In order to explain this, some basic information on effects of varying lambda will be given:

First, consider an engine running on gasoline at lambda one (i.e. with an air/fuel ratio being such that the air supplied to the engine is just sufficient to completely oxidize all fuel supplied to the engine to water and carbon dioxide). Then, the so called heat release rate, i.e. the combustion speed, will have a certain value. If the lambda value is increased, i.e. such that more air than necessary to completely oxidize all fuel is supplied to the engine, the heat release rate will decrease. Conversely, if more fuel than the air is able to oxidize is supplied to the engine, the heat release rate will increase until the air to fuel ratio reaches approximately 0.89, when heat release rate reaches its maximum.

As well known by persons skilled in the art, and as mentioned in the prior art chapter, an ion current signal is retrieved by applying a voltage over the electrodes of a spark plug of a cylinder in a spark ignited internal combustion engine. Depending on the concentration of electrically charged particles between the electrodes, a current will result from the voltage.

The actual, physical design of a system for retrieving the ion current signal is well known, and will hence not be dealt with in this application.

Figure 1:
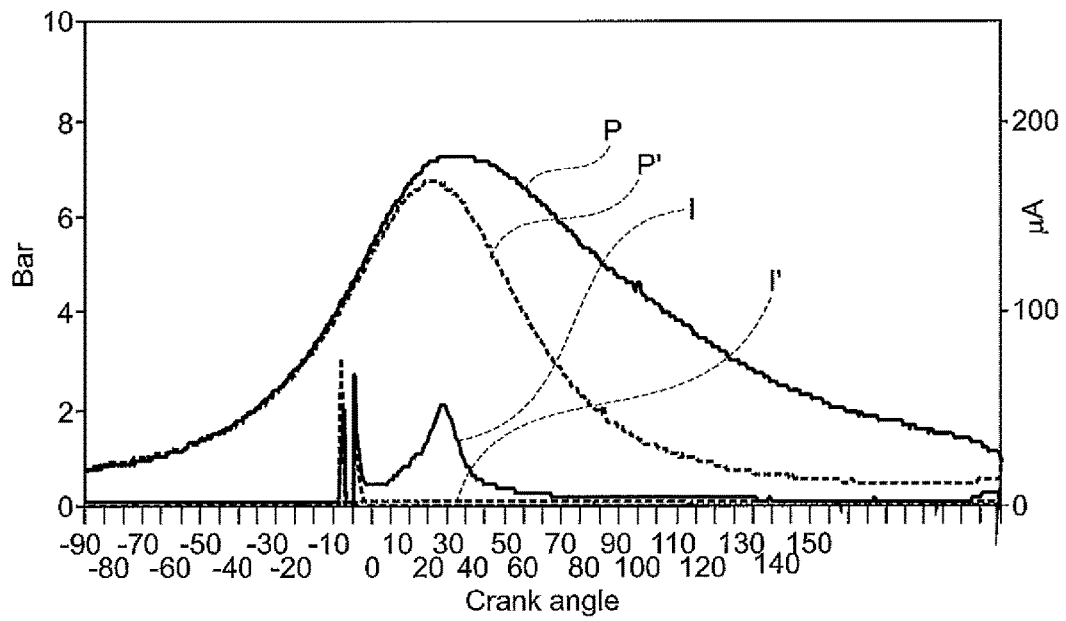
FIG. 1 is a diagram showing cylinder pressure and ion current for one cycle with normal combustion and one cycle without combustion.

Referring to FIG. 1, a cylinder pressure P and an ion current signal I for normal combustion in a cylinder of a spark ignition engine are shown as a function of crank angle degree for an example engine. Here, we will concentrate on the ion current signal.

At a crank angle of about −10 degrees, there is a first current peak. This current peak is due to start of dwell, and has nothing to do with the state in the cylinder. Then, at about −5 degrees, there is a second peak, which is due to the end of the spark and the rest energy in the ignition coil, which produces a "ringing" that lasts for a few crank angle degrees. After the ringing, the ionization of the gas in the cylinder is seen in the ion current trace, and the ion current signal becomes very interesting, i.e., approximately in the interval [0-90] crank angle degrees.

For comparison, a pressure trace P' and the ion current signal for a misfire cycle (i.e. a cycle wherein no combustion whatsoever has occurred) is also shown. As can be seen, there is a first peak around −10 crank angle degrees, and a second peak around −5 crank angle degrees, just as for the cycle with normal combustion. After these peaks, however, there is very little, or no, ion current. Hence, it can be concluded that the interesting crank angle degree interval in which to study the ion current signal is from about 0 to about 90 crank angle degrees, i.e. from about top dead center to about 90 degrees after top dead center. However, depending on engine and ignition system design, engine load and engine speed, the interesting crank angle degree interval may change.

Figure 2:
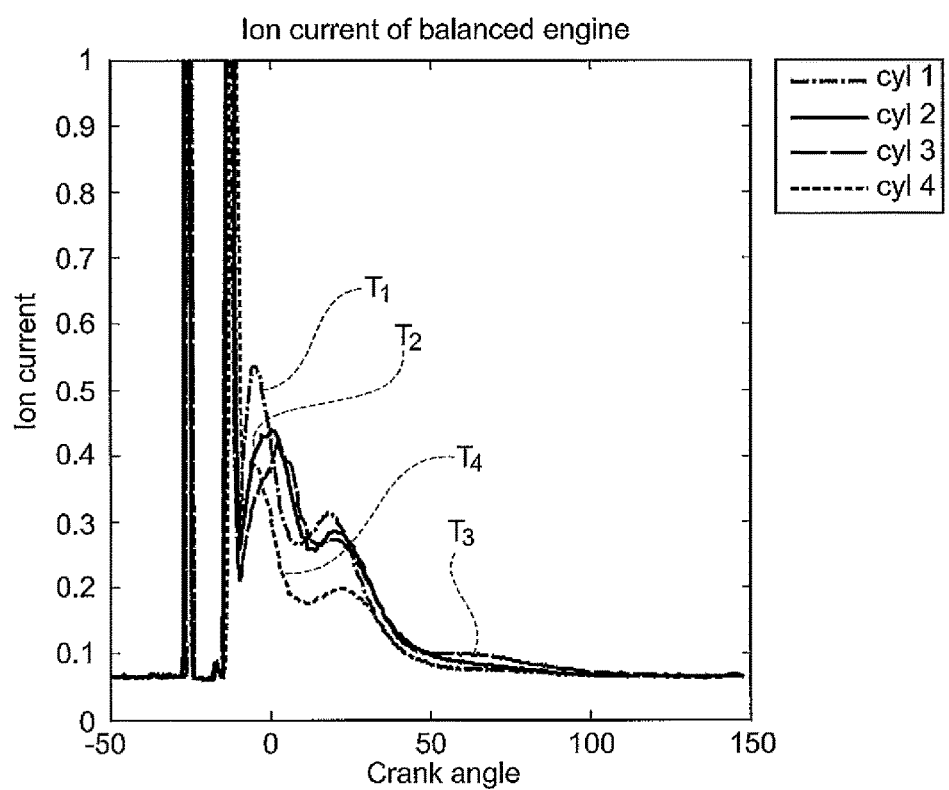
FIG. 2 is a diagram showing ion current as a function of crank angle degree for four different cylinder running in a balanced mode.

In FIG. 2, four ion current traces from four cylinders of an engine running "balanced", i.e. with the same (engine) load and air/fuel ratio for all cylinders are shown. As can be seen, the ion currents of the different cylinders vary significantly, despite the fact that the engine control parameters are equal in all the cylinders. This is due to cylinder individual differences in the breathing of fresh air and exhaust gas. This is one of the major difficulties with using ion current measurements from different cylinders isolated for balancing purposes; by simply studying the ion current traces from the cylinders of a balanced engine, it seems the cylinders are running with a high degree of imbalance. The challenge of the present invention is to present methods which are designed such that seemingly unlike ion current signals may be regarded as an indication that an engine is balanced.

Figure 3:
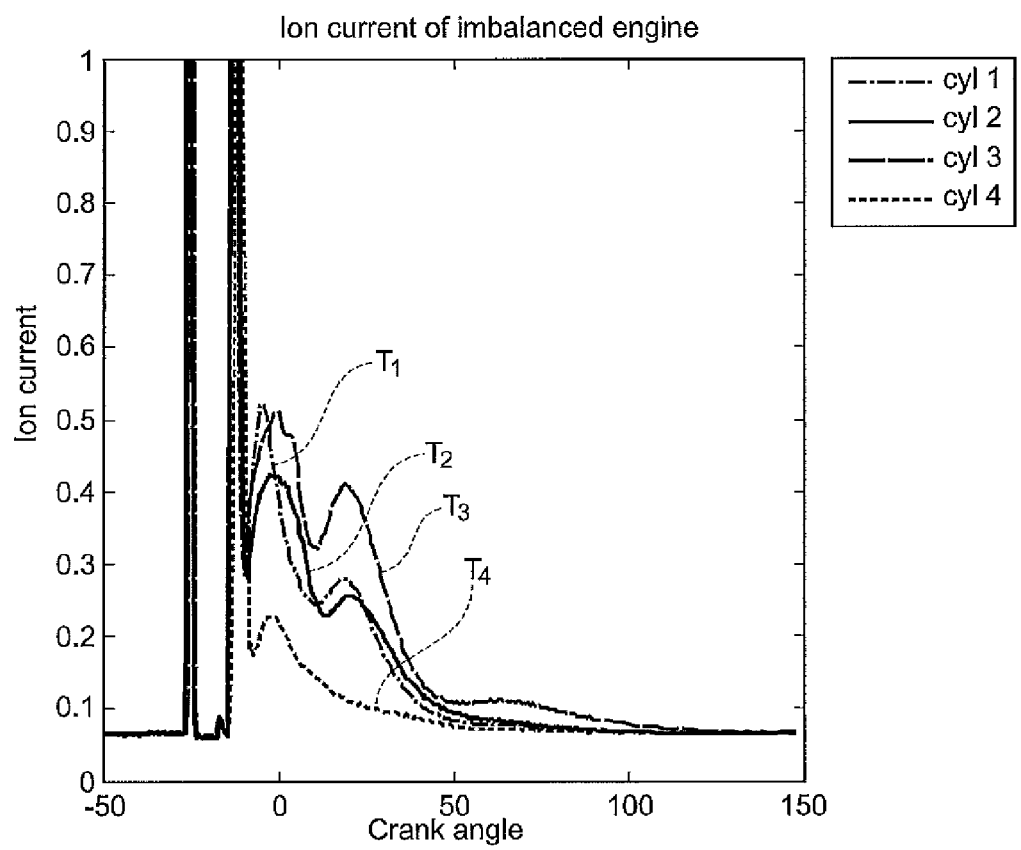
FIG. 3 is a diagram showing ion currents as a function of crank angle degree for four different cylinders running in a non-balanced mode.

In FIG. 3, four ion current traces from four cylinders of an engine running "imbalanced", i.e. with different air/fuel ratios for the different cylinders are shown. In this case, two of the cylinders run at an air/fuel ratio of 1.01, one at an air/fuel ratio of 0.96 and the last one at an air/fuel ratio of 1.07.

As can be seen, the differences between the ion current signals are smaller in the balanced engine than in the imbalanced one. However, there are major differences also between the ion current signals from the balanced engine, which poses a big problem if the ion current signals from the different engines are to be used without signal processing.

And here, the present invention can be applied.

According to a first aspect of the invention, it is possible to determine a deviation from the desired heat release rate, i.e. the speed of the combustion. As well known by persons skilled in the art, and as mentioned above, the heat release rate is highly dependent on the air/fuel ratio.

Figure 4:
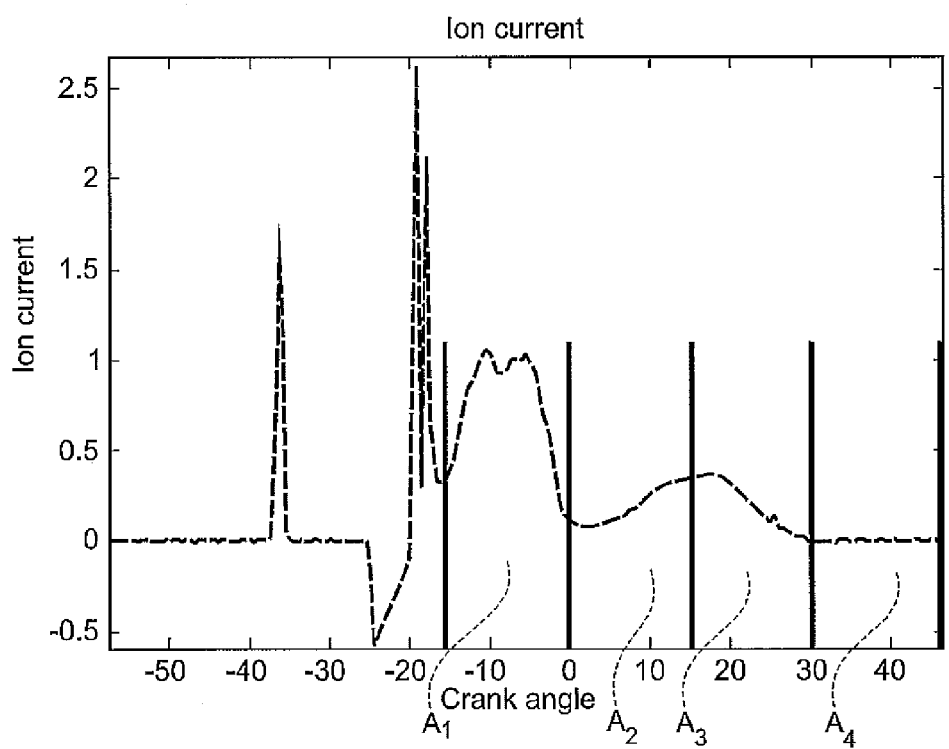
FIG. 4 is a diagram showing the ion current that has been divided into four sub intervals.

According to this aspect, in a first step, an ion current signal from a cylinder is divided into a number of crank angle subintervals as illustrated in FIG. 4, where the ion current has been divided into four consecutive sub intervals. The sub interval limits may be defined relative to the ignition timing or be fixed in crank angle degree or a combination of both. The ignition timing may be reliably measured directly from the ion current by identifying the characteristic shape of the ion current related to the spark. For example, the sharp edge significant of the end of the spark can be used as a starting point. The specific characteristic of the part of the ion current measurement that corresponds to the spark depends on the ion current measurement hardware design and may vary from design to design. However, given a specific hardware design, the characteristic ion current measurement shape corresponding to the spark is known. For each crank angle subinterval, the integral (sum) of the ion current is calculated. In the following, this integral is denoted "sub interval ion current area".

Then, in a second step, features that are independent of the amplification level of the ion current are computed using relative measures within a single ion current from a single cylinder and by using relative measures from a group of cylinders to be balanced. The subinterval ion current areas ($A_1$-$A_4$ in FIG. 4) from a specific cylinder are divided by the total area of all subinterval ion current areas from the same cylinder, such that a relative measure (percentage) of the ion current subinterval area is extracted. It is also possible to determine a center of mass, i.e. the crank angle for which there is equal subinterval areas on both sides of the crank angle within the subinterval. Another example of ion current feature is the percentage of the total area of the ion current from a cylinder as compared to that of the total area for all cylinders in the cylinder group to be balanced. The hereby computed ion current features are independent of the amplification level of the ion current sensor and depend only on the shape of the ion current trace or the relative ion current intensity between the cylinders. Hence, they are robust against changes in the ion current characteristic due to e.g. spark plug changes or wear and to any change that leads to a change in ionization intensity but leaves the characteristic shape of the ion current traces and the relative ionization levels unchanged.

The above mentioned relative measures do not necessarily make any sense in the actual physics of the engine; the relative measures only serve as information carriers. There may be other measures that can be computed from the ion current trace that do not depend on the amplification level but only on the characteristic shape. The computations described above serve merely as examples.

Figure 5:
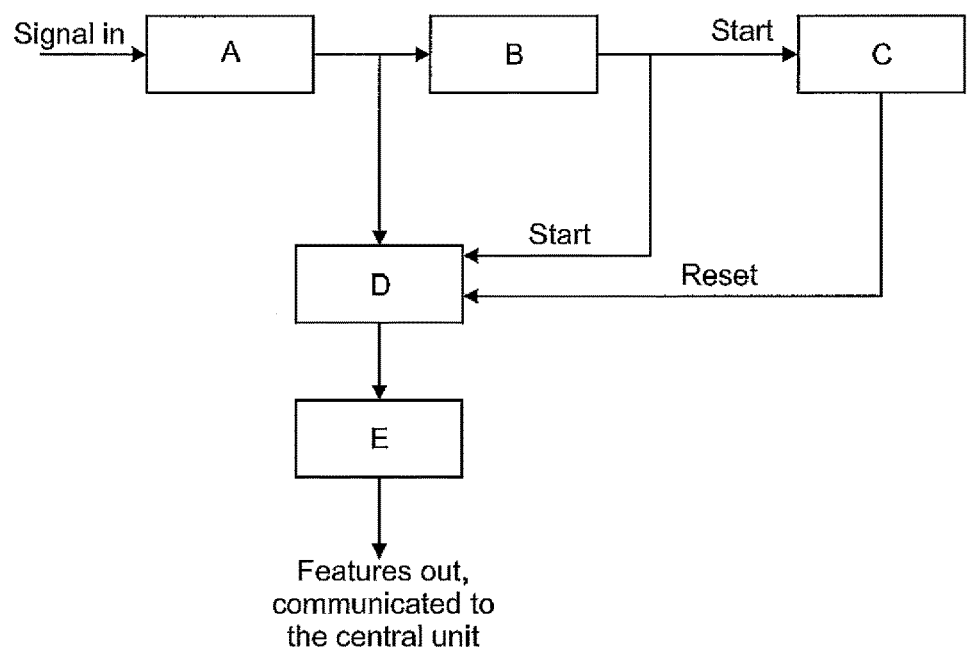
FIG. 5 is a block diagram showing how features can be computed using electronic circuits.

The area of the ion current in the sub intervals can be derived using electronic circuits integrated close to the ignition coil as illustrated in FIG. 5 which shows a block diagram of such a solution. In Block A the ion current is measured using an ion sense circuit. In Block B a part of the ion current measurement that is characteristic for the ignition event (spark) is identified and used as a trigger to start a timing unit (Block C) and an integration unit (Block D). The timing circuit, Block C, handles the timing for when the sub intervals end and sends a reset signal to the integrator circuit (Block D). The integrator circuit integrates the ion current in the sub intervals and communicates the sub interval areas to a communication circuit (Block E). The communication circuit, Block E, sends the hereby computed features to a central processing unit in common for a plurality of cylinders.

The environment close to the spark plug and the ignition coil is hostile and proven hard to integrate electronic circuits into. A major reason is the large temperature differences from cold start to an engine in full operation being very hot. The temperature differences cause the electronic circuits to drift, i.e., the performance and characteristics of the electronic circuits change with changing temperature. This may lead to a change in absolute value of the ion current sub interval areas. However, since the method may be based on the relative area, and since the temperature drift is much slower than a combustion cycle, such a drift is negligible from cycle to cycle. Hence, the invention enables the use of cost efficient electronic circuits suitable for mass production that computes the ion current features necessary for combustion monitoring.

Figure 6:
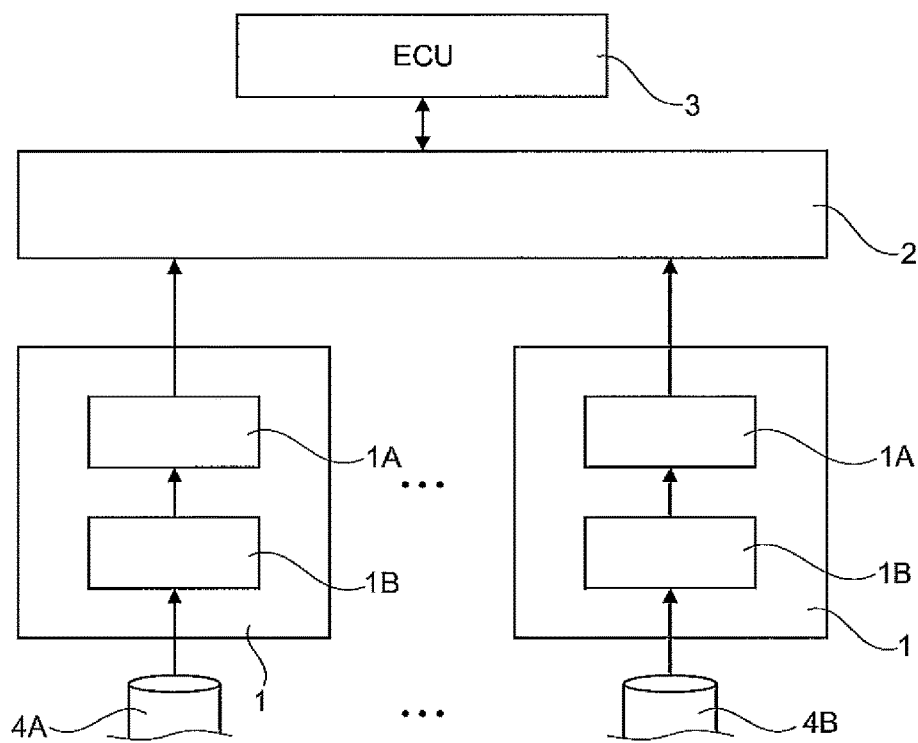
FIG. 6 is a block diagram showing the division of the method into calculation units.

FIG. 6 illustrates how the disclosed method can be divided into calculation units, comprising the steps of retrieving an ion current signal from a spark plug 4A, 4B of the cylinders to be monitored, performing a first calculation on said ion current signals in a first calculation unit 1, sending the result of the first calculation to a second calculation unit 2, and comparing the results from the first calculation unit 1 in the second calculation unit 2, characterized in that a plurality of ion current signals from a number of spark plugs 4A, 4B are retrieved and the results of said plurality of ion current signals being used in combination in said second calculation unit 2. The first calculation unit 1 is divided into a prior calculation unit 1A and a sub sequent calculation unit 1B. The calculation unit 1A may include retrieving a plurality of ion current features, wherein each ion current feature relates to a subset of data from said ion current signals (e.g. A1-A4 in FIG. 4). The calculation performed in said subsequent calculation unit 1B includes comparing the result of the first calculation with corresponding results made on ion current signals from an engine running in a balanced mode.

In the following, the hereby computed scalar values will be named ion current "features" and denoted $f_{i,j}(k)$, $i=1, \ldots, m$, $j=1, \ldots, n$ where k is the combustion cycle number, i is the feature number, m is the number of features computed in each cylinder at each combustion cycle, j is the cylinder number and n is the number of cylinders to be balanced. For convenience, the features computed from cylinder j at combustion cycle k will in the following be stacked in a vector and denoted $$\vec{f}_j(k),$$

$$\vec{f}_j(k) = \begin{pmatrix} f_{1,j}(k) \\ M \\ f_{m,j}(k) \end{pmatrix}.$$

In order to determine the relative heat release rate, and consequently whether the air/fuel ratio of each cylinder is equal to an average value for all of the cylinders, i.e. that each cylinder is balanced, the following procedure to get a statistical description of the combustion processes when the cylinders in the engine run in known preferred combustion states may be used. This is done by measuring ion currents in all cylinders in a reference engine run in a controlled environment, typically an engine dynamometer in a laboratory. First, ion current measurements are performed on all cylinders of the engine. Thereafter, the ion current features are calculated from each of the ion current measurements from each of the cylinders as described above. In some cases, it might be necessary to calculate the mean of the ion current features for each cylinder over a number of cycles, e.g. 10-20 cycles, due to the stochastic behavior of the ion current.

Then, the statistical property describing how the ion current features from each cylinder behave is derived. This may, e.g., be done by computing the first and second order statistical moments of the ion current features, hereby forming mean feature vectors and covariance matrices, respectively. Let the mean feature vector from cylinder j be denoted by $$\overline{\vec{f}_j}$$

and computed by $$\overline{\vec{f}_j} = \frac{1}{N} \sum_{k=1}^{N} \vec{f}_j(k) = \begin{pmatrix} \overline{f}_{1,j} \\ \overline{f}_{m,j} \end{pmatrix},$$

where N is the number of recorded combustion cycles, $\overline{f}_{i,j}$ denotes the mean value of feature i in cylinder j and m is the number of features. Let the deviation of the measured ion current features from its mean value at combustion cycle k be denoted by $$\vec{d}_j(k) = \vec{f}_j(k) - \overline{\vec{f}_j}.$$

Furthermore, let the covariance matrix of $$\vec{d}_j(k), k = 1, K, N$$

be denoted by $R_j$ and computed by $$R_j = \frac{1}{N} \sum_{k=1}^{N} \vec{d}_j(k) \cdot \vec{d}_j^T(k)$$

$$= \frac{1}{N} \begin{pmatrix} \sum_{k=1}^{N} d_{1,j}(k) \cdot d_{1,j}(k) & K & \sum_{k=1}^{N} d_{1,j}(k) \cdot d_{m,j}(k) \\ M & O & M \\ \sum_{k=1}^{N} d_{m,j}(k) \cdot d_{1,j}(k) & L & \sum_{k=1}^{N} d_{m,j}(k) \cdot d_{m,j}(k) \end{pmatrix}$$

The mean feature vectors $$\vec{f}_j$$

and the covariance matrices $R_j$, computed from data collected from the engine running with all cylinders in a preferred combustion process mode, may be used as a "statistical signature" of how the ion current features of cylinders j=1, K, n behave when the engine is running in the preferred mode. The statistical signatures may, in combination with ion current feature observations from a running engine, be used to detect if a cylinder deviates from the desired combustion process state.

The statistical signature may change with engine operating condition, such as engine speed and load. Then a grid of statistical signatures may be derived that correspond to a pre-defined set of engine operating conditions and stored in a memory. The signature that applies to the current engine operating condition would then be used in the method. It is also possible to interpolate between statistical signatures to derive a signature that better describes the statistical behavior in-between adjacent stored statistical signatures.

The statistical description of the features when the engine is running in a preferred mode will signify the desired state and any deviation from this state shall be detected.

Formulated differently, if the ion current features differ significantly from the value they had when the cylinder was running balanced and in preferred combustion process states, then this shall be detected and corrected accordingly.

A first alternative to detect a deviation from the preferred combustion process in the cylinders (due to, e.g., a deviation in air to fuel ratio) is simply to compare the values of the feature vector observations $$\vec{f}_j(k)$$

with the (stored) mean value $$\vec{f}_j.$$

In such an approach only the first order statistical moment is used.

Another option is to use more elaborate statistical methods to detect deviations from the desired combustion process state that weighs together a plurality of features according to their information quality by using higher order statistical moments. This can, e.g., be done by using a so called Mahalanobi distance measure, which is a statistical measure of how different two sets of observations are. Let the Mahalanobi distance related to observations of features from cylinder j be defined by $$M_j(k) = \sqrt{\vec{d}_j^T(k) \cdot R_j^{-1} \cdot \vec{d}_j(k)}$$

The Mahalanobi distance is hence a measure of how different the observed features $$\vec{f}_j(k)$$

are from the ones that were collected from the engine when it was running in a preferred combustion process mode and stored in a condensed format in the "statistical signature"

$$\vec{f}_j$$

and $R_j$. If the statistical property of the observations is similar to the one significant of the preferred combustion process mode, then the Mahalanobi distance will be small (the data sets are alike). If the observations differ, then the Mahalanobi distance will be large (the data sets are different).

The next step is to design a detector of deviation from the desired combustion process state based on the information in the Mahalanobi distances $M_j(k)$, j=1, . . . , n. If, for example, cylinder number p deviates from the desired combustion state (i.e. runs with too much air or too much fuel), then the Mahalanobi values related to cylinder p will be significantly larger than those associated with a normal combustion process state. The Mahalanobi distances from the other cylinders running in the preferred combustion states will, however, be unchanged. Hence, if it is noted that the Mahalanobi values that correspond to a specific cylinder become significantly larger than that corresponding to the desired combustion process state of that cylinder and larger than the Mahalanobi distances from the other cylinders in the cylinder group, then it can be deduced that the cylinder does not run in the desired mode. In such a case, an engine control system can either send an error signal to the operator of the engine (e.g. a driver of a car or other vehicle) or it can alter e.g. the fuelling of the cylinder. It should be noted that the Mahalanobi distances do not contain information on whether a cylinder running in a non-preferred mode runs with too much or too little fuel; however, by increasing or decreasing the amount of fuel supplied to the cylinder, it is possible to see whether the cylinder comes closer to running in the preferred mode or gets further away from the preferred mode, and adjust the injection timing accordingly.

It might also be interesting to actually analyze the Mahalanobi distance measures. For example, if we consider a four cylinder engine, the first element $M_1(k)$ is a statistical measure of how dislike the combustion process for cylinder one is as compared to a mean desired combustion process for cylinder one. Likewise, $M_2(k)$, $M_3(k)$ and $M_4(k)$ are statistical measures of how dislike the combustion processes in cylinders 2, 3 and 4 are compared to mean desired combustion processes for these cylinders. Assume that the combustion process in cylinder one deviates from the desired combustion process, e.g., due to a deviation in air/fuel ratio, and the other combustion processes are unchanged. Then the mean of $M_1(k)$ will increase significantly whereas the mean of $M_2(k)$, . . . , $M_4(k)$ will be unchanged. Now, assume that a systematic change that affects all cylinders has influenced the ion currents in all cylinders, e.g. a change in fuel quality. Then the mean of all Mahalanobi distances $M_1(k)$, . . . , $M_4(k)$ will increase. An algorithm that only takes the magnitude into account would falsely indicate imbalance. There is a need to distinguish between the two cases and not only study the magnitude of the Mahalanobi distances.

One approach to design an algorithm that automatically detects an imbalance is to compute the relative Mahalanobi distances and trigger imbalance detection if the relative Mahalanobi distance is above a threshold value. The detector would not react on a systematic change that affects all cylinders but will detect a change in a single cylinder. The algorithm for such a detector may be formulated as follows. Let $\overline{M}_j(k)$ denote the relative Mahalanobi distance $$\overline{M}_j(k) = \frac{M_j(k)}{\sum_{j=1}^{m} M_j(k)}.$$

By construction, $0 \leq \overline{M}_j(k) \leq 1$. For example, if there are four cylinders and the engine is running balanced, then $\overline{M}_j(k) \approx 0.25, j=1,\ldots,4$. In the case of imbalance in cylinder p, however, the corresponding relative imbalance measure $\overline{M}_p(k)$ becomes greater than the other, i.e. $\overline{M}_p(k) > \overline{M}_j(k), j \neq p$. An imbalance is detected if $$\overline{M}_p(k) > T,$$

where $0 < T < 1$ is the detection threshold and a design parameter.

When the engine is running with correct fuelling in all cylinders and the correct ignition timing is applied, then the engine is running with preferred combustion processes in all cylinders. If the fuelling is changed in a cylinder, then this will be detected and the reason for the deviation from the desired combustion needs to be determined.

If a significant deviation is detected, then it is necessary to understand what the reason for the deviation is before the engine control unit (ECU) can take any action such that the state of the combustion process returns to the desired (optimal) state. This can be done by a classification of the recorded observations as follows. A set of statistical descriptions are stored a priori. Each statistical description represents a non-desired combustion state, e.g., too fast heat release rate (rich air/fuel ratio) or too slow heat release rate (lean air/fuel ratio). Let $\Lambda_{rich}$, defined as $$\Lambda_{rich} = \left\{ \frac{r}{f_{rich}}, R_{rich} \right\},$$

denote the statistical description for the combustion process when using a rich air/fuel ratio and let $\Lambda_{lean}$, defined as $$\Lambda_{lean} = \left\{ \frac{r}{f_{lean}}, R_{lean} \right\},$$

denote the corresponding combustion process when using a lean air/fuel mixture. Then, using $\Lambda_{rich}$ and $\Lambda_{lean}$, compute a measure of the probability that the observations come from the statistical descriptions $\Lambda_{rich}$ and $\Lambda_{lean}$, respectively. This can be done by computing the corresponding Mahalanobi distances using $\Lambda_{rich}$ $$\overset{r}{d}_{j,rich}(k) = \overset{r}{f_j}(k) - \overset{r}{f_{j,rich}}$$

$$M_{j,rich}(k) = \sqrt{\overset{r}{d}_{j,rich}^T(k) \cdot R_{j,rich}^{-1} \cdot \overset{r}{d}_{j,rich}(k)}$$

and by using $\Lambda_{lean}$ $$\overset{r}{d}_{j,lean}(k) = \overset{r}{f_j}(k) - \overset{r}{f_{j,lean}}$$

$$M_{j,lean}(k) = \sqrt{\overset{r}{d}_{j,lean}^T(k) \cdot R_{j,lean}^{-1} \cdot \overset{r}{d}_{j,lean}(k)}$$

respectively.

Then, to determine the reason (lean or rich) why the desired combustion state deviates from the optimal in cylinder j, choose the statistical description that describes the observed data the best, i.e., the statistical model that yielded the least Mahalanobi distance:

$$\text{classification}_j(k) = \arg \min_{lean, rich} \{M_{j,rich}(k), M_{j,lean}(k)\}$$

Through the procedure disclosed above the reason for the deviation from the desired combustion process is determined and a corrective measure can be taken by the ECU.

For example, assume we want to detect if the cylinders in an engine are running imbalanced w.r.t. air/fuel ratio. Consider a case when cylinder p is running too lean. Then, an imbalance would be detected for cylinder p and the probabilities that cylinder p is running lean or rich, respectively, are computed using $\Lambda_{p,rich}$ and $\Lambda_{p,lean}$, respectively. The Mahalanobi distances computed using the statistical description representing a lean combustion process $\Lambda_{p,lean}$ state will be smaller than the statistical description representing a rich combustion process state $\Lambda_{p,rich}$. The classification would hence indicate that cylinder p is running lean. The ECU can take a corrective measure by increasing the fuelling of cylinder p. This procedure is repeated until the engine is running in an optimal and balanced state.

In general, when an imbalance has been detected and the reason classified, then the resulting information is fed to the ECU which can take a corrective measure. A pre-defined number of cycles are allowed to pass before the result of the action is evaluated. The strategy is repeated. Hereby the cylinders will be controlled to maintain the desired combustion process state.

If the engine control parameters are available (e.g. fuelling and ignition timing) another approach to maintain the desired combustion process state is possible. Then the control parameters can be perturbed and the change in statistical measure of how alike the combustion process is the preferred one (e.g. the Mahalanobi distance) may be observed. From the observations it can be computed how the control parameters shall be changed in order to decrease the value of the statistical measure of how alike the combustion process is the preferred, hereby minimizing it with time.

Below, a strategy usable for detecting a change in fuel quality will be described:

Consider the case when the global lambda sensor (measuring the average of the lambda values in the group of cylinders) indicates $\lambda = 1.00$ and the relative Mahalanobi distances $\overline{M}_j(k)$, j=1, ..., n do not indicate an imbalance but the absolute Mahalanobi distances $M_j(k)$, j=1, ..., n are significantly larger than those expected. Then this indicates that a systematic change has occurred and that there is not an imbalance between the cylinders since all Mahalanobi distances are indicating large values and hence the ion current in all cylinders deviate significantly from what is expected. An example of such a systematic change is a change in fuel quality which will affect all cylinders in the same way. Such changes in fuel quality pose a problem when using, e.g., natural gas as fuel. Then the quality of the fuel (mixture of different gas types) can vary significantly from one fuelling to another. The performance of the engine will be degraded if the gas quality deviates from what the engine was tuned for, with increasing fuel consumption and emissions as a consequence.

Since the global lambda sensor indicates that the average of the in cylinder air/fuel ratios is OK, the large absolute Mahalanobi distances can be explained by incorrect statistical descriptions $\Lambda_{j,OK}$, j=1,K, n for the fuel type used in the engine, where $\Lambda_{j,OK}$ denotes the statistical description that corresponds to the preferred combustion process. Assume that a set of statistical descriptions corresponding to a set of r known possible fuel types has been identified through experiments. The problem is then to find which of the r statistical models that explains the observed data the best. This can be done by using a classification approach as follows. Compute the Mahalanobi distances using the fuel type specific statistical descriptions. The fuel used in the engine is classified to be the fuel type that corresponds to the statistical description that explains the observed data best, i.e., has the smallest Mahalanobi distance. The result of the classification is communicated to the engine control unit which can use the information to apply the engine control mapping that corresponds to the fuel.

If the fuel is best described by a combination of the r statistical descriptions that have been stored, then the models can be interpolated and the resulting model that minimizes the Mahalanobi distance is chosen. The fuel mixture in the tank is then assumed to be a function of the hereby identified statistical description.

Above, the focus has been the air/fuel ratio, a measure that correlates well with the combustion rate. However, other parameters influence the combustion rate as well, such as the exhaust gas recirculation (EGR) or the amount of inert gas in natural gas. The invention disclosed will detect any change of such parameters as well. For example, a change in the amount of inert gas in natural gas could be detected as a change in fuel quality as described above. In some cases, however, it may be possible to adjust the ignition timing without necessarily changing the statistical model associated with the fuel.

EXAMPLE

The amount of inert gas has changed from one fuelling to another. The air/fuel ratio is OK (balanced) in all cylinders which is seen from the global lambda sensor measurements and the balancing method disclosed here.
1) Then the combustion rate changes in all cylinders
    a) Less inert gas gives a faster combustion
    b) More inert gas gives a slower combustion
2) The combustion phase will then deviate from the optimal, i.e., the MFB50 has changed, MFB50 timing being the crank angle position wherein 50 percent of the fuel charge in the cylinder has burned
    a) The Mahalanobi distances from all cylinders have large absolute values
    b) The relative Mahalanobi distances indicate that the cylinders are balanced (appr. same value)
3) This implies that the ignition timing needs to be adjusted in all cylinders to achieve MBT timing, MBT timing being the spark timing giving maximum engine torque, i.e. maximum efficiency
    a) Advance if inert gas has increased, i.e. classification indicates slow combustion
    b) Retard if inert gas decreased, i.e. classification indicates fast combustion
4) Adjust the ignition timing until the absolute values of the Mahalanobi distances reaches a minimum
    a) Can be done by stepwise changes of ignition timing until convergence to minimum of the Mahalanobi values So, if it is known a priori that it is the amount of inert gas that changes when using natural gas as fuel but the property of the combustible gas is unchanged, then as in the example above the ignition timing can be used to achieve the so called MBT-timing, i.e. the crank angle degree where the spark should be located to give the best fuel economy.

The amount of inert gas in the fuel is just one example of when a parameter that affects the combustion may change. There may be other parameters that affect the combustion process. The disclosed invention offers a method to detect such changes and adjust the control parameters to achieve a combustion as close as possible to an optimal combustion process. For example, the in-cylinder charge (amount of fuel and air) can be balanced using the invention, which would be of interest if the air supply to the cylinders could be controlled individually. The torque generated by the engine is the sum of the torque contributions from all cylinders. The torque generated by a cylinder is highly correlated to the charge (amount of fuel and air) input in the cylinder. If the torques generated by the cylinders are not equal the engine is imbalanced with respect to in-cylinder torque. This will give rise to vibrations and unnecessary energy losses. However, the ionization intensity is highly dependent on the total charge in a cylinder. Consequently, by comparing ionization intensity in a cylinder relative to the total ionization intensity in all cylinders (relative total area) one may use the same method as described above to balance the cylinders with respect to their charges.

To conclude, using the invention disclosed here, it is possible to monitor a deviation of the combustion process states in each cylinder with respect to heat release rate, combustion phase and charge.

CONCLUDING REMARKS

In the description of the disclosed invention it is clear that the control system can be viewed as a nested control system consisting of two loops:
1. Adjust for systematic changes such as fuel quality, amount of inert gas etc.
2. Adjust for cylinder individual deviations, i.e., imbalance.

For the engineer skilled in the art statistical signal processing it is understood that other statistical measures and methods than those described here may be used to compute a statistical measure of the deviation from the desired combustion process. For example, one may use a projection instead of computing the Mahalanobi distances. It is also possible to measure and compute the statistical properties of many combustion process states (of which one may be the desired state) and use the hereby computed statistical descriptions to perform multi-hypothesis tests using, e.g., log likelihood approaches or projections. The invention disclosed here is not limited to the Mahalanobi distance as the computed measure of how different the observed combustion process is from that of a preferred one.

The invention claimed is:

1. An engine, comprising:
   a plurality of cylinders;
   each cylinder comprising an ignition coil;
   each ignition coil comprising at least one electronic circuit that:
   detects a spark event of a spark plug;
   measures the ion current from said spark plug, and
   calculates a dimension free relative measure of the ion current from each of said plurality of cylinders based on a time or crank angle from the detected spark event; and
   an engine control unit comprising a central processing unit that receives said dimension free relative measures from each cylinder and uses said relative measures from said plurality of cylinders to improve a performance of said engine.

* * * * *